(12) United States Patent
Utaki et al.

(10) Patent No.: US 7,428,808 B2
(45) Date of Patent: Sep. 30, 2008

(54) CABLE OR THE LIKE PROTECTION AND GUIDE DEVICE

(75) Inventors: Akihiko Utaki, Osaka (JP); Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/699,929

(22) Filed: Jan. 31, 2007

(65) Prior Publication Data

US 2007/0218829 A1  Sep. 20, 2007

(30) Foreign Application Priority Data

Mar. 14, 2006  (JP) .............................. 2006-069527

(51) Int. Cl.
*F16G 13/16*  (2006.01)
(52) U.S. Cl. .......................... 59/78.1; 248/49
(58) Field of Classification Search ................. 59/78.1, 59/900; 248/49, 51
See application file for complete search history.

(56) References Cited

U.S. PATENT DOCUMENTS 5,038,556 A * 8/1991 Moritz et al. ................ 59/78.1
5,048,283 A * 9/1991 Moritz et al. ................ 59/78.1
5,184,454 A * 2/1993 Klein et al. .................. 59/78.1
6,094,902 A * 8/2000 Drews et al. ................. 59/78.1

FOREIGN PATENT DOCUMENTS

| DE | 3814995 | * | 7/1989 |
| JP | 09-177902 | | 7/1997 |
| JP | 10-047441 | | 2/1998 |
| JP | 2000-120807 | | 4/2000 |

OTHER PUBLICATIONS

U.S. Appl. No. 11/699,912, Utaki et al., Entire Document.
U.S. Appl. No. 11/701,960, Utaki et al., Entire Document.

* cited by examiner

*Primary Examiner*—David B Jones
(74) *Attorney, Agent, or Firm*—Woodling, Krost and Rust (57) ABSTRACT

A cable protection and guide device includes an engagement mechanism for securing connecting plates in a bridged arrangement over flexional inner and outer circumferential sides of side plates of the device. The connecting plates are not inadvertently disengaged because the engagement mechanism includes several features for securing the connecting plates to the side plates. The connecting plate engagement mechanism has a louver body and a louver type connecting plate which pivots about a pair of right and left supporting shafts which are formed at both ends of the louver type connecting plate. The louver type connecting plate is attachably fitted onto the pair of right and left side plates.

4 Claims, 11 Drawing Sheets

CABLE OR THE LIKE PROTECTION AND GUIDE DEVICE

This application claims priority to Japanese Patent Application 2006-069527 filed Mar. 14, 2006.

The present invention relates to a cable protection and guide device. More specifically it relates to a cable protection and guide device suitable for accommodating a cable, a hose, or the like which supplies a movable member of an industrial machine with electric power or energy in the form of compressed air. The cable protection and guide device safely and reliably guides and protects a cable (cables) during movement of the movable portion of the industrial machine.

BACKGROUND TECHNOLOGY

Conventional cable protection and guide devices are known in the prior art. Typically, upper edge portions and lower edge portions of a pair of spaced and opposed link plates with the same shape are respectively connected using a flap and a bottom plate as connecting members.

In the typical arrangement of a protection and guide chain, the flap includes a pivoting engagement portion and a securing engagement portion in its longitudinal direction. The flap is pivotably attached to an upper end portion of a link plate. The flap can be respectively detached or attached and opened or closed from both end sides.

Patent Reference 1 is Japanese Laid-Open Patent Publication No. Hei 10-47441.

Patent Reference 2 is Japanese Laid-Open Patent Publication No. 2000-120807.

Problems to be Solved by the Invention

In the protection and guide chains in Patent References 1 and 2, when an opening/closing structure is pivoted about the other end in a longitudinal direction of a flap to be opened and closed, a force from the cable or hose inside the cable protection and guide can arise apply a biased load on the flap. Unfortunately, the flap can then be inadvertently disengaged. Further, one end of the flap on the longitudinal direction may bite into the cable or hose during the opening and closing of the flap. As a result, the cable or hose may be damaged.

Additionally, in the protection and guide chains in the prior art, for example Patent References 1 and 2, at least one end of a flap must be opened so that a cable or a hose accommodated inside is exposed for maintenance. As a result, maintenance is increased when inadvertent disengagement or loss of the flap occurs.

Accordingly, the object of the present invention is to solve the above-mentioned problems by providing a cable protection and guide device which uses connecting plates strongly secured to the device. As a result, even if a force comes from inside the protection and guide device, the connecting plates are not disengaged. Further, damage to the cable during opening/closing of the flap is avoided. Assembling and disassembling of the chain is also greatly simplified.

Means for Solving the Problems

The invention attains the above-mentioned object with a cable or the like protection and guide device that has a number of pairs of right and left spaced side plates connected to each other in a longitudinal direction. Louver type connecting plates are detachably bridged over flexional inner circumferential sides and flexional outer circumferential sides of side plates in predetermined intervals. A cable is accommodated in a cable accommodating space surrounded by side plates and louver type connecting plates along the longitudinal direction. A connecting plate engagement mechanism has a louver body which is pivoted about a pair of right and left supporting shafts. The right and left supporting shafts are formed at both ends of the louver type connecting plate in a protruded manner and are attachably fitted onto the pair of right and left side plates. The louver body is secured in an engaged manner. The connecting plate engagement mechanism is provided between the louver type connecting plate and the side plate.

The invention includes a connecting plate engagement mechanism comprised by a width direction positioning portion, a pivot restricting portion, and a bridge state holding portion. In the width direction position portion the supporting shaft of the louver type connecting plate and a fitting shaft hole in the side plate are engaged with each other.

The supporting shaft includes a partially cut out concave portion/convex portion combination arrangement. In the pivot restricting portion the supporting shaft of the louver type connecting plate and a fitting shaft hole in the plate are engaged with each other in a partially cut out concave portion/convex portion combination arrangement. A bridge state holding portion wherein a louver body of the louver type connecting plate and a protruded tongue piece supporting portion formed on an inner side of the side plate are engaged in a cut out concave portion/convex portion combination arrangement.

The invention includes a configuration where both ends of the louver body abut on the inner sides of the side plates in a bridged state of the louver type connecting plate.

Effects of the Invention

First, a number of pairs of right and left spaced side plates are connected to each other in a longitudinal direction. Louver type connecting plates are detachably bridged over flexional inner circumferential sides and flexional outer circumferential sides of the side plates with predetermined intervals. A cable, hose, or similar structures can be accommodated in a cable accommodating space surrounded by the side plates and the louver type connecting plates along the longitudinal direction.

Further, a connecting plate engagement mechanism has a louver body which includes the louver type connecting plate. The louver type connecting plate is pivoted about a pair of right and left supporting shafts which are formed at both ends of the louver type connecting plate in a protruded manner. The louver type connecting plate is attachably fitted onto the pair of right and left side plates so that the louver body is secured in an engaged manner. The connecting plate engagement mechanism is provided between the louver type connecting plate and the side plate.

Even if a force is generated by the cable from within the guide device, a strong connection between louver type connecting plates and the supporting shafts prevents inadvertent disengagement.

The pair of right and left supporting shafts formed at both ends of the louver type connecting plate in a protruded manner is fit onto the pair of right and left side plates. The louver type connecting plate is supported on the pair of right and left side plates at both ends of the louver type connecting plate and the supporting shafts. Thus, a strong connection is formed so that an inadvertent disengagement can be completely avoided. Further, since both ends of the louver type connecting plates are simultaneously fitted into the pair of right and left side plates during operation of opening and closing the connecting plates, bite damage due to offset of the cable accommodated inside can be completely avoided during the operation of opening and closing of the connecting plates.

Additionally, the louver body of the louver type connecting plate is formed so that it can be pivoted or rotated about a pair of right and left supporting shafts. The louver type connecting plate is pivoted with respect to the side plate, so that the louver body can be raised without having to be removed from the side plate during maintenance of the cable. Thus, the cable can be easily exposed, attaining easy access for maintenance of the cable from the outside.

Further, the connecting plate engagement mechanism comprises a width direction positioning portion where the supporting shaft of the louver type connecting plate and a fitting shaft hole in the plate are engaged with each other in a partially cut out concave and convex portion combination arrangement. The connecting plate engagement mechanism also has a pivot restricting portion where the supporting shaft of the louver type connecting plate and a fitting shaft hole in the plate are engaged with each other in a partially cut out concave portion/convex portion combination arrangement. A bridge state holding portion wherein a louver body of the louver type connecting plate and a protruded tongue piece supporting portion formed on an inner side of the side plate are engaged in a cut out concave portion/convex portion combination arrangement.

In addition to the structure discussed above, when the louver type connecting plate is incorporated to the side plates, the above-described width direction positioning portion correctly positions and guides the louver type connecting plate without displacing it in the width direction with respect to the side plate as the side plate rises. Then the incorporated louver type connecting plate is moved as a lid-like element with respect to the side plates, the above-described pivot restricting portion rotates the supporting shaft of the louver type connecting plate in the fitting shaft hole of the side plate and positions and guides the louver body of the louver type connecting plate to the lid position. When the incorporated and rotated louver type connecting plate is held at the lid position, the above-described bridge state holding portion allows the louver body of the louver type connecting plate to engage with the tongue piece supporting portion formed on the inner side of the side plate in a concave portion/convex portion combination thereby, holding the bridge state of the louver type connecting plate. Further, assembly and disassembly operations such as attachment and detachment of the louver type connecting plate and the like can be easily and efficiently attained.

Both ends of the louver body abut on the inner sides of the side plates in a bridged state of the louver type connecting plate. In addition to the effect obtained by the invention mentioned above, when the cable protection and guide device protects and guides a cable in a flexed state, even if a shearing force is received that crushes the cable in the width direction, both ends of the louver body entirely abut on the inner sides of the side plates thereby to strongly ensure the cable accommodating space surrounded by side plates and louver type connecting plates. Thus, excellent size stability and endurance of the cable protection and guide device can be exhibited even in flexion and stretch operations for long periods of time.

The strong engagement of the connecting plates prevents inadvertent disengagement even if a force arises from the inside of the cable guide and protection device where the cable is being stored in the cable accommodating space. Further, bite damage of the cable or stored structure during the opening and closing operation of the connecting plate is avoided. Also, the assembly and disassembly of the connecting plate is easy. These benefits are realized by a cable or the like protection and guide device having the following structure: a number of pairs of right and left spaced side plates connected to each other in a longitudinal direction; louver type connecting plates detachably bridged over flexional inner circumferential sides and flexional outer circumferential sides of the side plates in predetermined intervals; and, such that a cable is accommodated in a cable accommodating space surrounded by the side plates. The louver type connecting plates along the longitudinal direction of this structure are further characterized by a connecting plate engagement mechanism in which a louver body of the louver type connecting plate is pivoted about a pair of right and left supporting shafts which protrude at both ends of the louver type connecting plate. The pair of right and left supporting shafts of the louver type connecting plate are attachably fitted onto the pair of right and left side plates, so that the louver body is secured in an engaged manner between the louver type connecting plate and the side plate. The present invention is set forth herein by way of example only and those skilled in the art upon reading this disclosure will realize that the invention disclosed herein may be used in many different embodiments of the cable protection and guide device.

The side plate and the louver type connecting plate in the cable guide and protection device are made of engineering plastic resins. The resins endure flexion during flexional movement and exhibit excellent size stability in a cable-holding form. Resins such as polyamide 6, polyamide 12, polyamide 46, polyamide 66, acryl, polyacetal or the like, which are easy to mold, may be used. When a polyamide 6-GF composition, in particular, is used, the GF (glass fiber) formulated in polyamide 6 create high rigidity and further exhibit excellent stability of the device. Thus, the polyamide 6-GF composition is preferable.

Although the louver type connecting plates used in the cable protection and guide device according to the present invention are detachably bridged over the flexional inner circumferential side and the flexional outer circumferential side of the side plates, they may be used on the flexional outer circumferential side of the side plates only. Alternatively, the louver type connecting plates may be bridged over every side plate or intermittently in the longitudinal direction.

Further, the side plates may be arranged such that the front side plate portion is connected to a preceding side plate and a rear side plate portion is connected to the subsequent side plate by a connecting pin mechanism. The connecting pin mechanism, which connects the side plates to each other and pivotably flexes them, may be arranged in an offset manner between a rear side plate portion of the preceding side plate and a front side plate portion of a side plate subsequent to the rear side plate portion.

Additionally, a side plate having the form may be used wherein a front side plate portion connected to a preceding side plate, a rear side plate portion connected to the subsequent side plate, and a flexible coupling portion is integrally interposed between the front side plate portion and the rear side plate portion. A snap-fit mechanism, which connects the side plates to each other, is provided between a rear side plate portion of a preceding side plate and a front side plate portion of a side plate subsequent to the rear side plate portion. In the latter case, an inadvertent disengagement of the side plate at a coupling portion due to repeated flexional operations is avoided. The load likely to occur at a flexed portion during the restriction of a flexional position is avoided so that excellent endurance is achieved. Also, the maintenance is reduced by using fewer parts and assembly is performed easily.

Further, when a flexible coupling is used, the side plates include a linear position holding surface for holding a cable in a linear position and a flexional position restricting surface for restricting the cable during flexure of the device. These linear position holding surfaces and the flexional position restricting surface may be provided on any portion on the flexional outer circumferential side or flexional inner circumferential side of a side plate other than a coupling portion of the side plate. These linear position holding surfaces and the flexional position restricting surface may be provided even on an end surface or a side surface of the side plate.

Again, to repeat, the linear position holding surface is formed on either the flexional outer circumferential side portion or on a flexional inner circumferential side portion rather than the coupling portion thereof. Again, to repeat, the flexional position restricting surface is formed on a flexional outer circumferential side portion or on a flexional inner circumferential side portion rather than the coupling portion of the side plate. A load at the coupling portion is avoided so that excellent endurance is achieved. The coupling portion becomes a flexional portion during the restriction of flexional position. Since the surface contact load between side plates generated during restriction of flexional position and during holding of linear position is dispersed into two parts on the flexional outer circumferential side and the flexional inner circumferential side, the linear connection state and the flexional connection state can be endurably and reliably held. Thus such an arrangement of the linear position holding surface and the flexional position restricting surface is preferred.

DESCRIPTION OF THE INVENTION

EXAMPLE

A cable or the like protection and guide device 100, which is an example of the present invention, will be described with reference to FIGS. 1 and 9 below.

Figure 1:
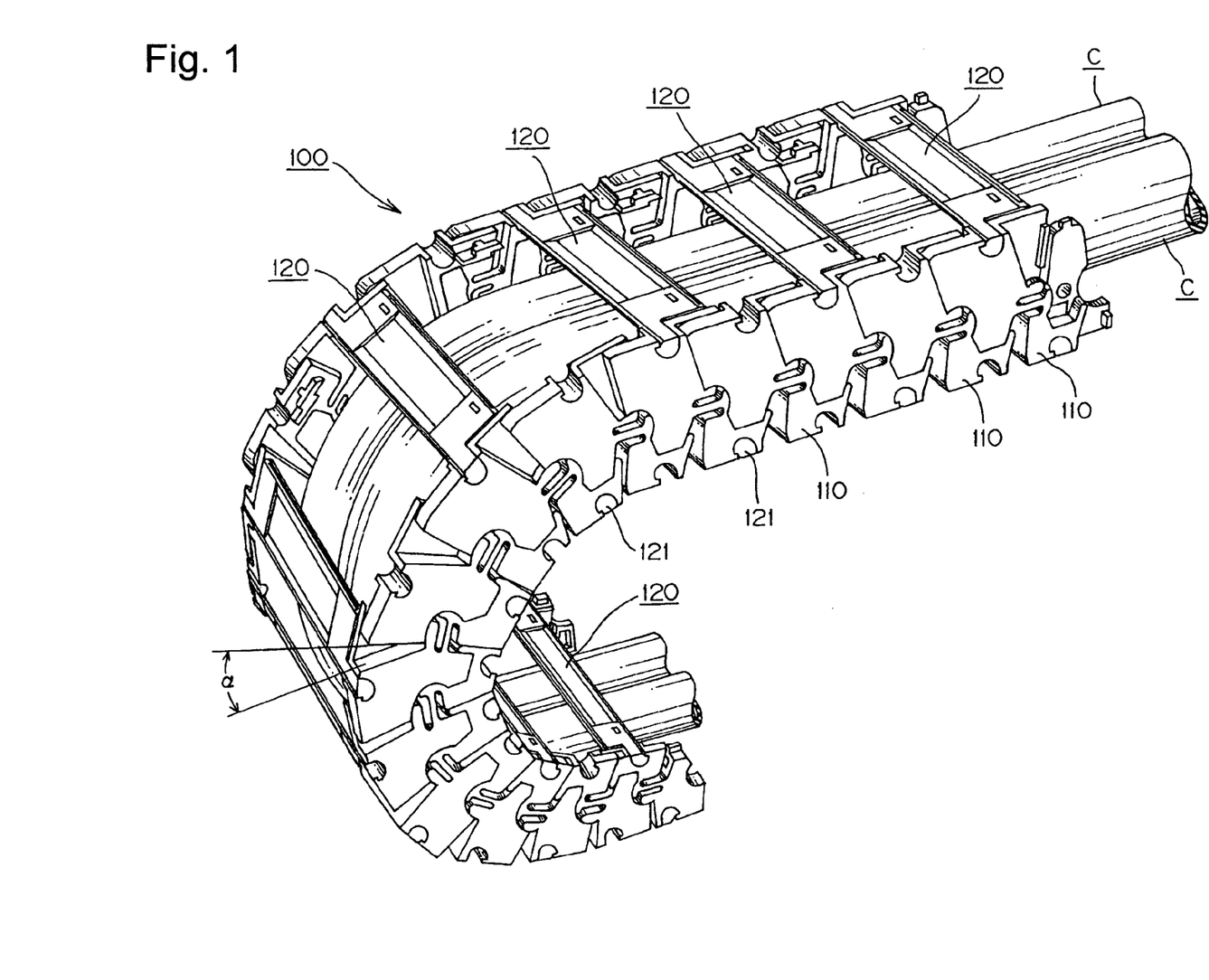
FIG. 1 is an entire view showing a use form of a cable or the like protection and guide device, which is an example according to the present invention.
Figure 2:
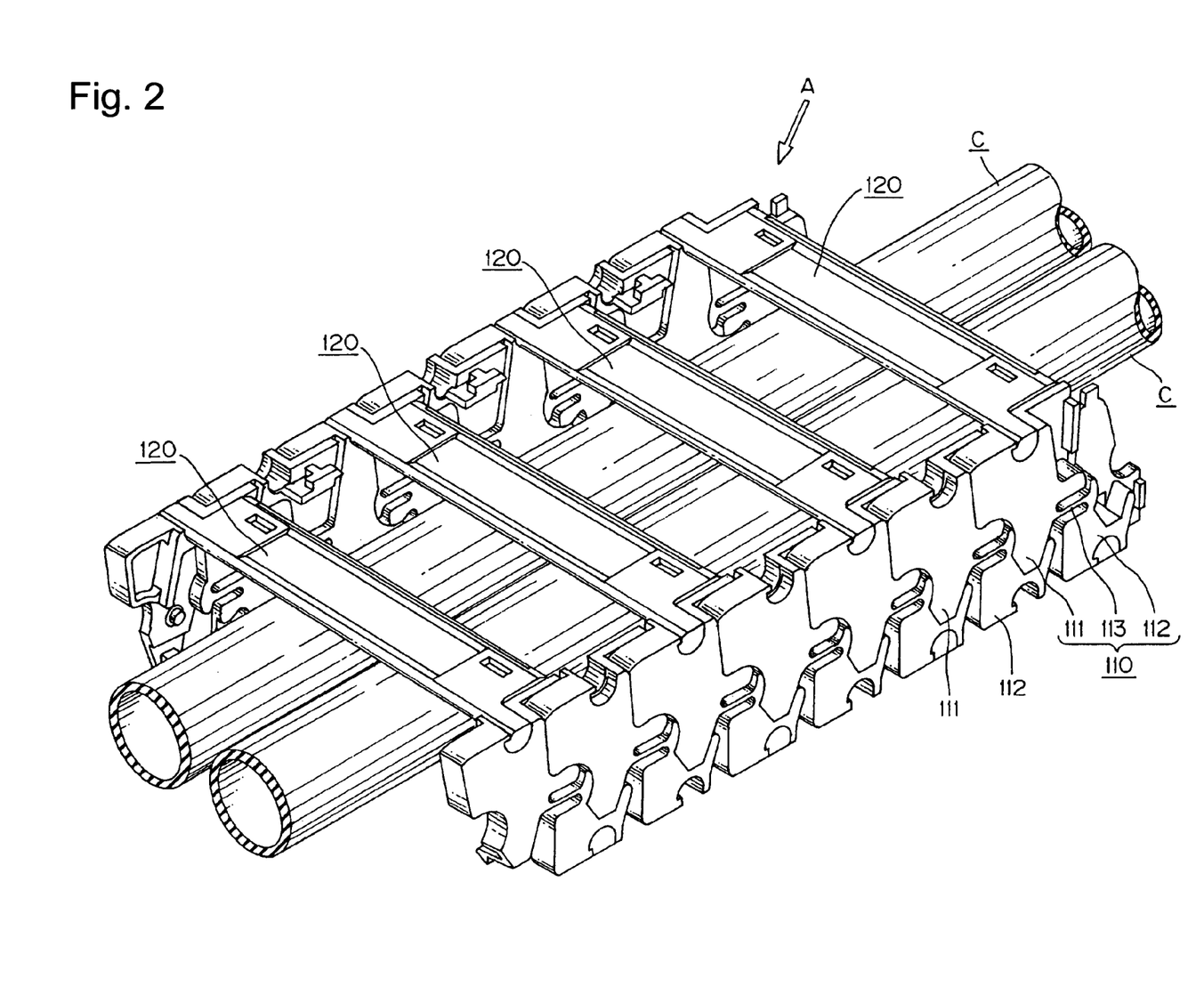
FIG. 2 is a perspective view showing a use form of a linear connection state in FIG. 1.
Figure 3:
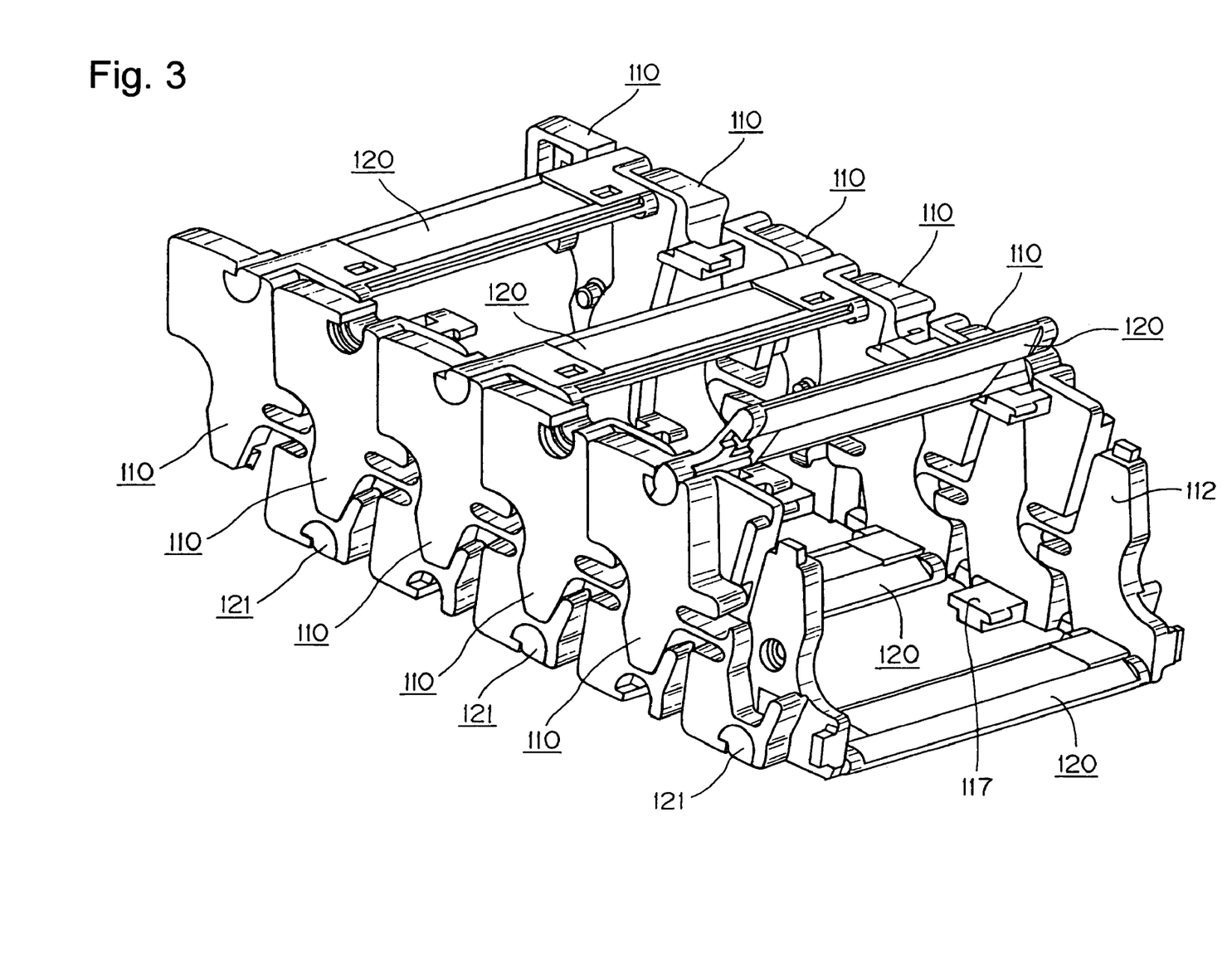
FIG. 3 is a perspective view viewed from a direction of an arrow A in FIG. 2.
Figure 4:
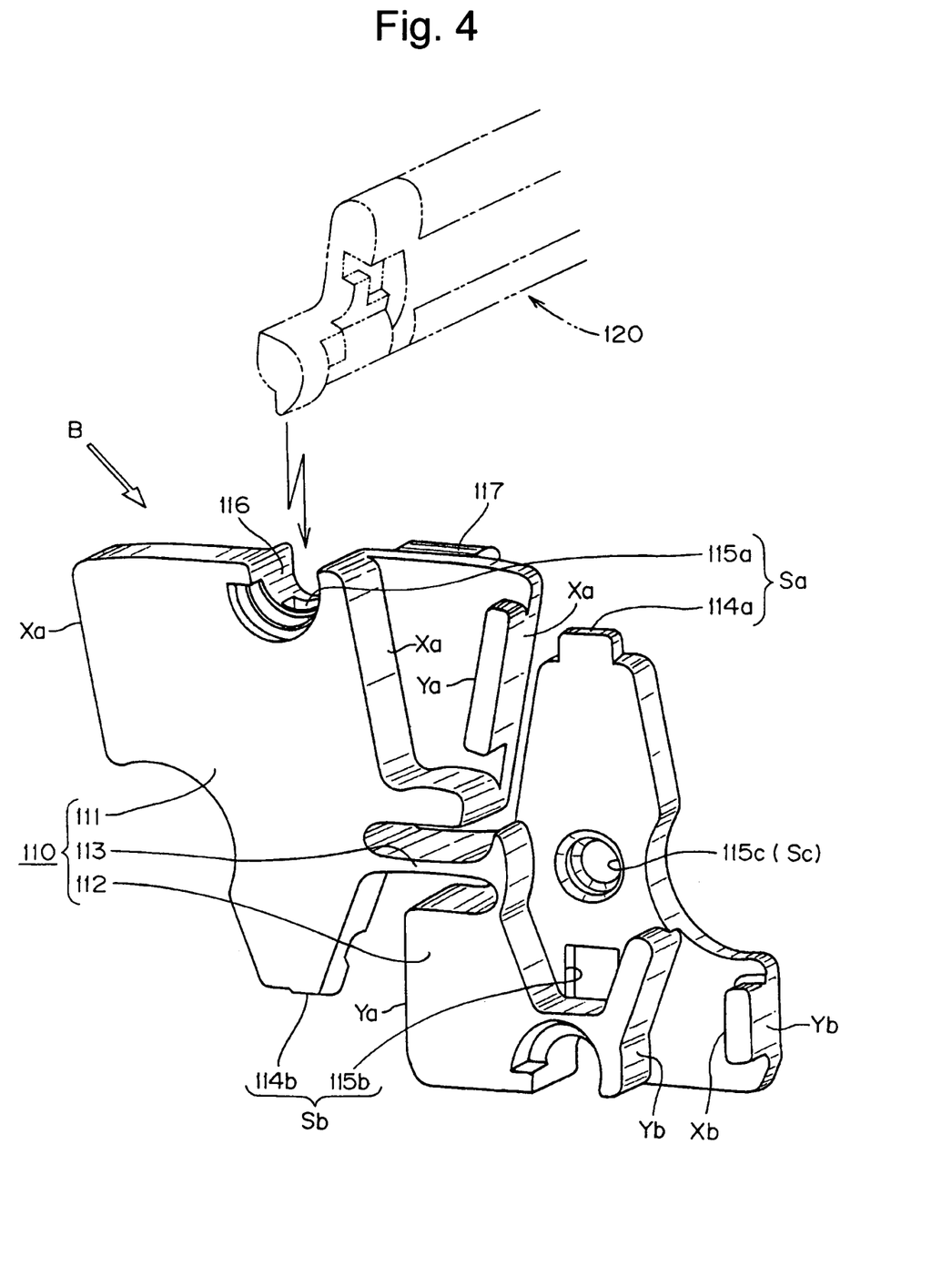
FIG. 4 is a perspective view of a side plate used in the cable or the like protection and guide device shown in FIG. 3.
Figure 5:
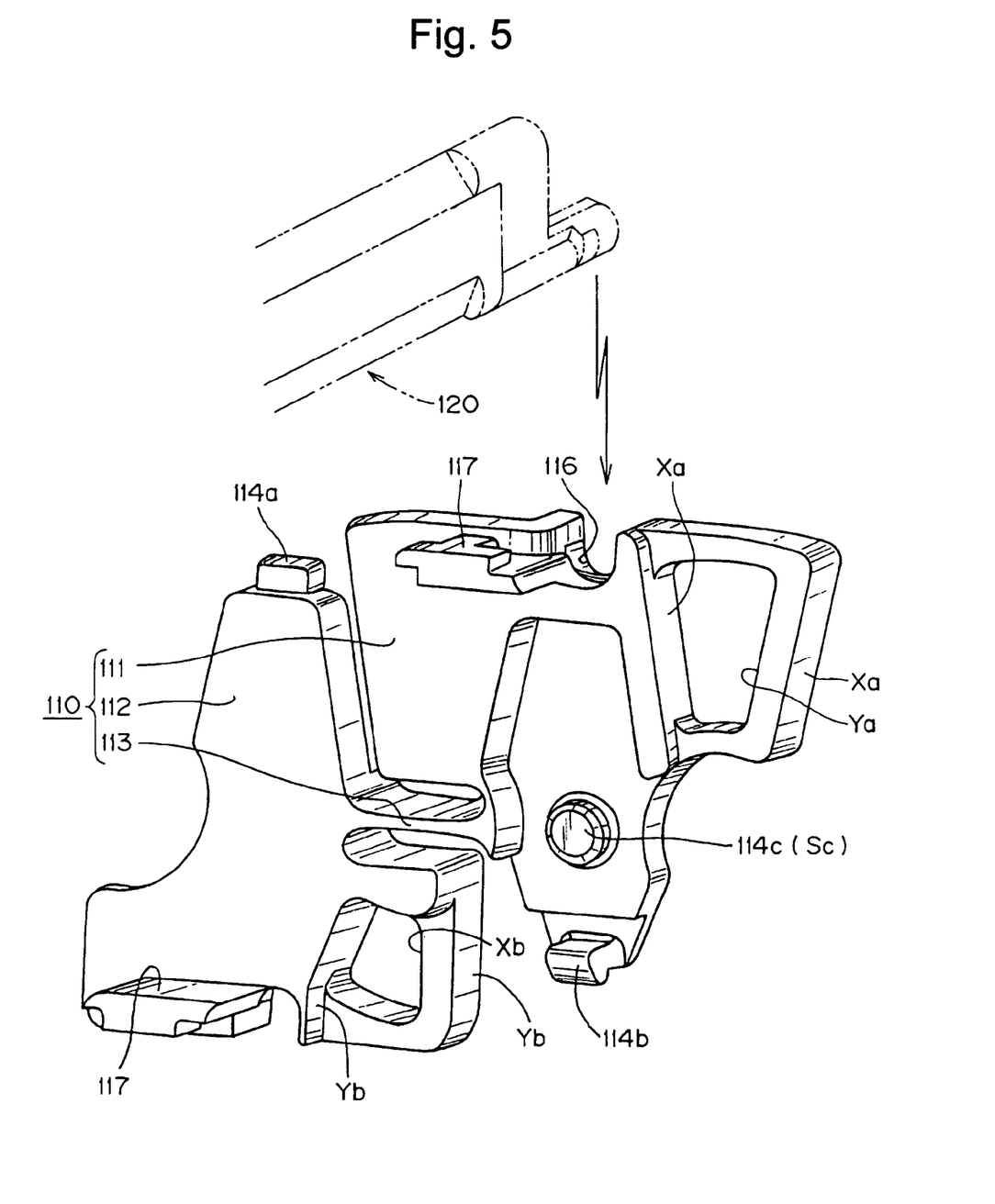
FIG. 5 is a perspective view of the side plate viewed from a direction of an arrow B in FIG. 4.
Figure 6:
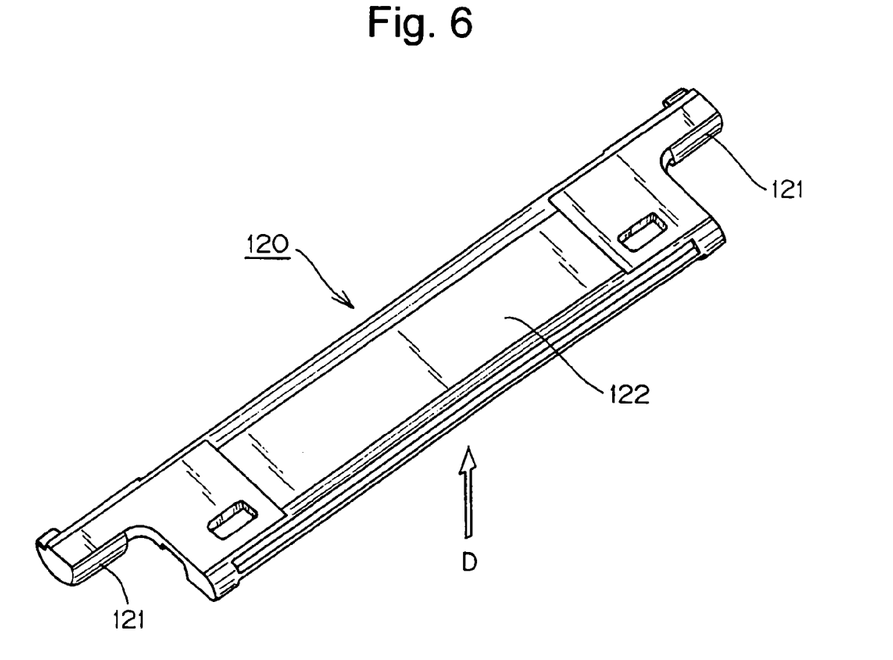
FIG. 6 is a perspective view of a louver type connecting plate used in the cable or the like protection and guide device shown in FIG. 3.
Figure 7:
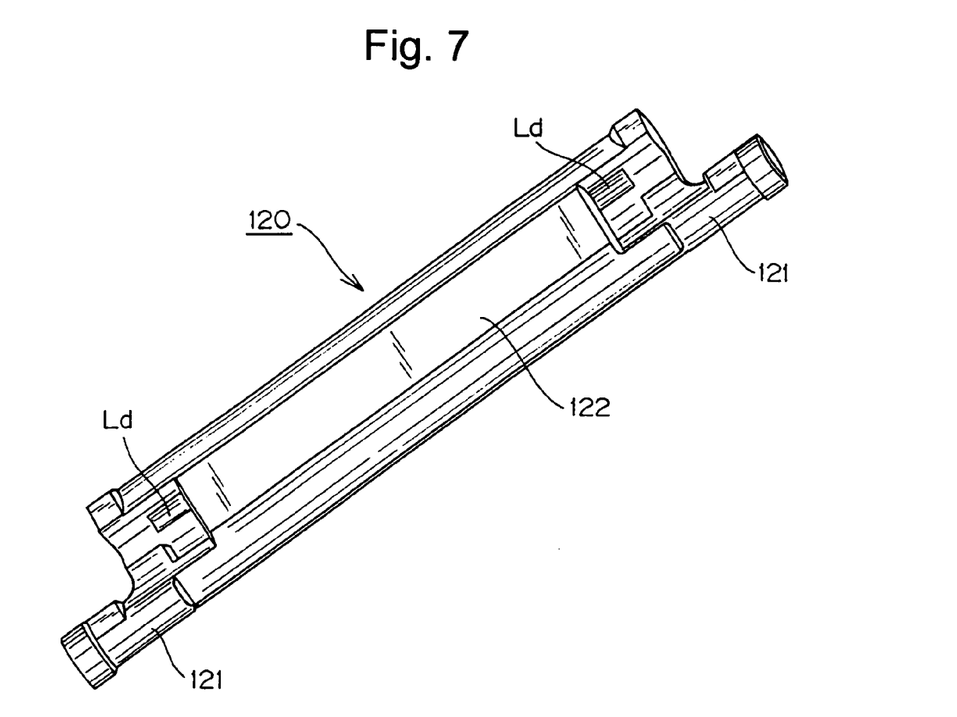
FIG. 7 is a perspective view of a side plate viewed from a direction of an arrow D in FIG. 6.
Figure 8:
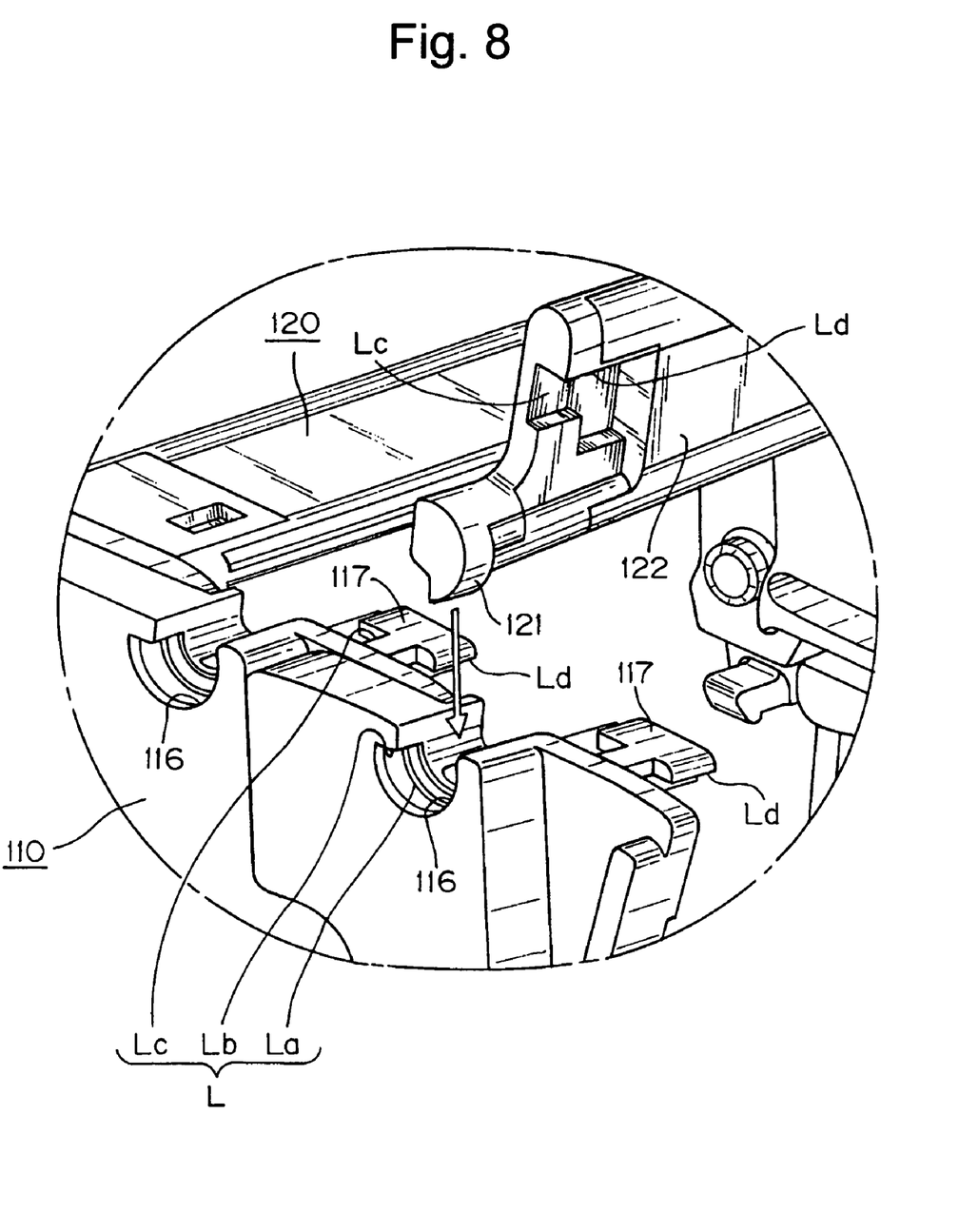
FIG. 8 is an enlarged view showing a state just before incorporation of a louver type connecting plate.
Figure 10:
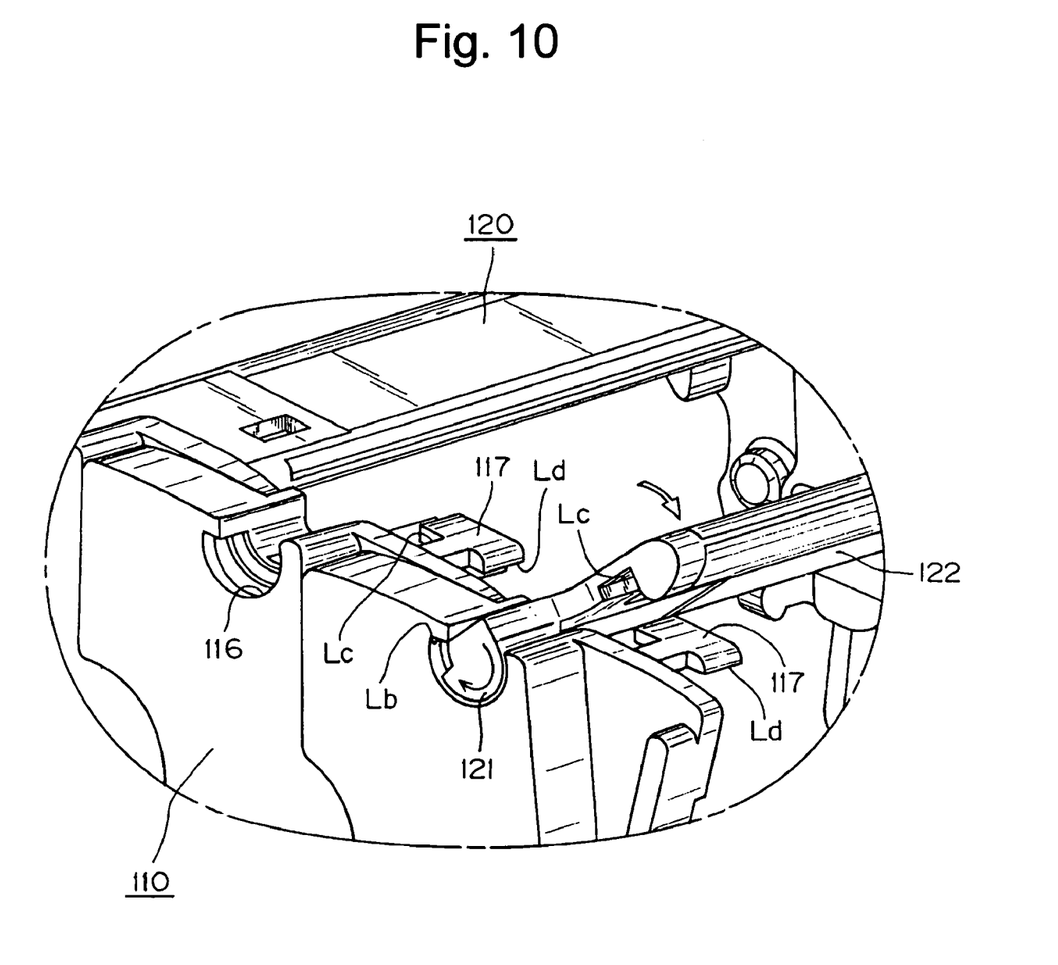
FIG. 10 is an enlarged view showing a pivot state of the louver type connecting plate.
Figure 11:
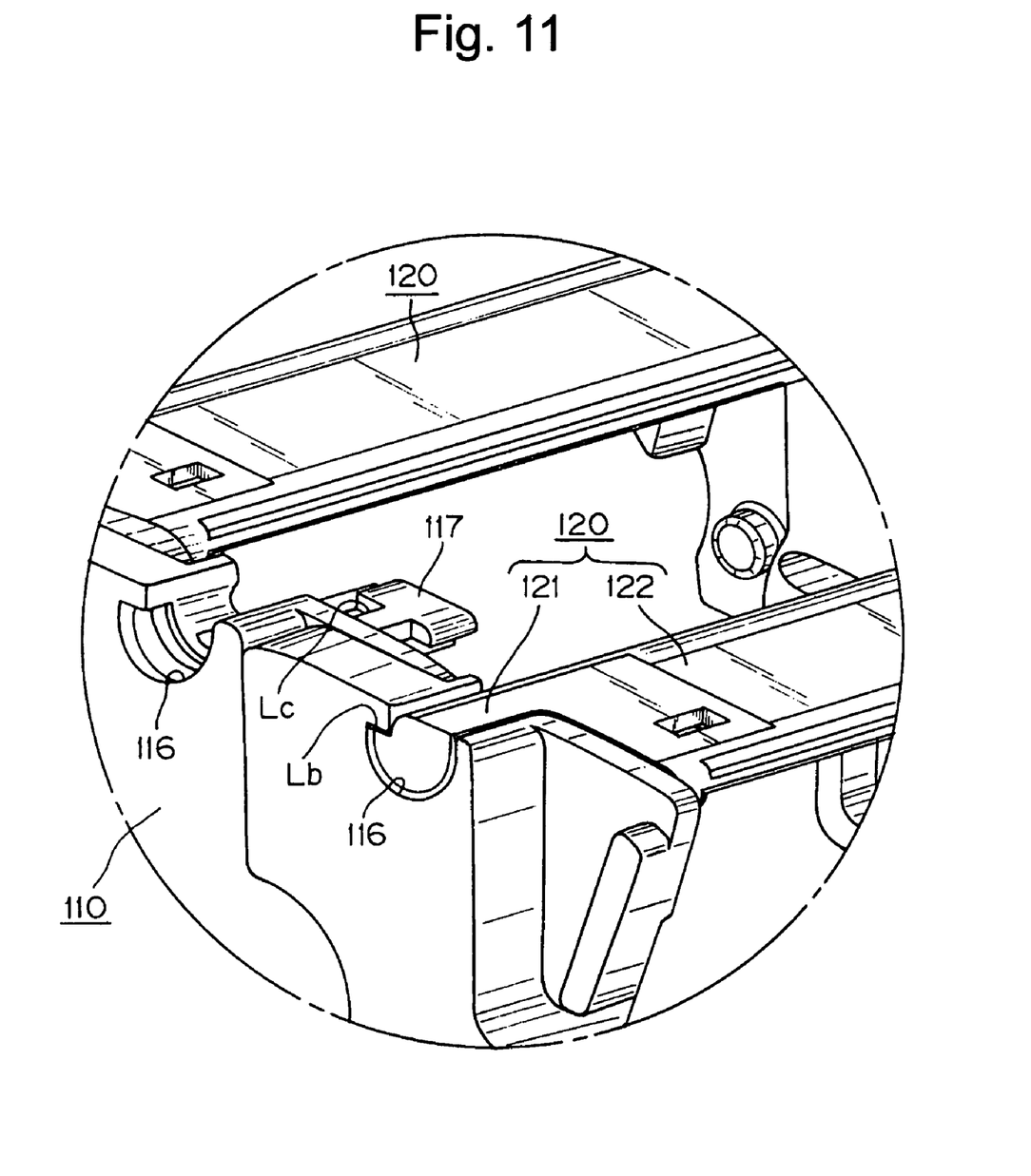
FIG. 11 is an enlarged view showing an incorporation completion state of the louver type connecting plate.

Here, FIG. 1 is an entire view showing a use of a cable or the like protection and guide device 100, which is an example according to the present invention. FIG. 2 is a perspective view showing a use of a linear connection state in FIG. 1. FIG. 3 is a perspective view viewed from a direction of an arrow A in FIG. 2. FIGS. 4 to 7 are views of parts of the cable or the like protection and guide device 100 shown in FIG. 3. FIG. 4 is a perspective view of a side plate used in the cable or the like protection and guide device 100 shown in FIG. 3. FIG. 5 is a perspective view of the side plate viewed from a direction of an arrow B in FIG. 4. FIG. 6 is a perspective view of a louver type connecting plate used in the cable or the like protection and guide device 100 shown in FIG. 3. FIG. 7 is a perspective view of a side plate viewed from a direction of an arrow D in FIG. 6. FIGS. 8 to 11 are explanatory views showing assembly steps of a side plate and a louver type connecting plate. FIG. 8 is an enlarged view showing a state just before incorporation of a louver type connecting plate. FIG. 9 is an enlarged view showing a state just before incorporation of a louver type connecting plate. FIG. 10 is an enlarged view showing a pivot state of the louver type connecting plate. FIG. 11 is an enlarged view showing an incorporation completion state of the louver type connecting plate.

The cable or the like protection and guide device 100, which is an example of the present invention, is used for protecting and guiding cables or the like C. The cables may be electric cables, which connect between a movable portion and a stationary portion in a semiconductor device, a pharmacy development testing device, a door opening/closing device for a vehicle, or the like to carry out transmission and supply of electric signals, and hoses, which supply pressure liquid or pressure gas. The cables are longitudinally connected the movable portion and the stationary portion (not shown). Further, the cable or the like protection and guide device 100 can exhibit a linear position or a flexional position in accordance with relatively remote movement conditions between the movable portion and the stationary portion. As shown in FIGS. 1 to 3, the cable or the like protection and guide device 100 is formed in such a manner that a number of right and left pair of spaced plates 110, 110 are connected to each other in a longitudinal direction. The louver type connecting plates 120 are respectively bridged over flexional inner circumferential sides and flexional outer circumferential sides of these side plates 110, 110 with alternate arrangement intervals of the side plates 110, 110, so that a cable (or cables) or the like C is accommodated in a cable accommodating space with a rectangular section, surrounded by these right and left pair of side plates 110, 110. The louver type connecting plates 120, 120 are arranged on the flexional inner circumferential side and the flexional outer circumferential side in a bridged manner along the longitudinal direction.

It is noted that the above-described movable portion and stationary portion are not shown in FIG. 1. Further, although in the cable or the like protection and guide device 100 of this example, the louver type connecting plates 120 are bridged in alternate arrangement intervals with respect to the side plates 110, 110 connected to each other in a large number, for example they may also be bridged by the corresponding ratio of 1 to 1 of the larger number of respective side plates 110 connected to each other. That is, there may be one louver type connecting plate for each pair of right and left side plates.

The side plates 110, 110 used in this example are molded by a two-color molding method and are symmetrical in a spaced right and left pair. The plate 110 is integrally formed of a polyamide 6-GF composition front side plate portion 111 connected to a preceding side plate (not shown), a polyamide 6-GF composition rear side plate portion 112 connected to a subsequent side plate, and a flexible polyamide 66-rubber composition coupling portion 113 integrally interposed and intervened between the front side plate portion 111 and the rear side plate portion 112, as shown in FIGS. 4 and 5.

It is noted that the hypothetical (dashed) lines in FIGS. 4 and 5 show a louver type connecting plate 120 incorporated to the side plate 110.

In this case, since the coupling portion 113 composed of a polyamide 66 rubber composition, which is a fatigue resistant resin, is flexibly adapted to repeated flexion, the cable or the like protection and guide device 100 can exhibit excellent fatigue resistance to repeated flexion. Further, since the front side plate portion 111 and rear side plate portion 112 are composed of a polyamide 6-GF composition, which is a highly rigid resin, flexion strain liable to be generated during a flexion operation is concentrated and absorbed therein such that the cable or the like protection and guide device 100 is stable.

Referring to FIGS. 2, 3, 4 and 5, between the rear side plate portion 112 of the preceding side plate and the front side plate portion 111 of the side plate 110 subsequently connected thereto are several engagement mechanisms Sa, Sb and Sc. Specifically, a flexional outer circumferential side concave portion/convex portion engagement mechanism Sa, a flexional inner circumferential side concave portion/convex portion engagement mechanism Sb, and a concave portion/convex portion engagement mechanism Sc are located in the vicinity of the coupling portion 113, and are engaged to each other. Side plates 110, 110 adjacent to each other through these concave portion/convex portion engagement mechanisms Sa, Sb, and Sc are attachable to and detachable from each other. Maintenance of the cable or the like protection and guide device 100 can be easily attained during connection and disconnection of the side plates 110, 110.

The concave portion/convex portion engagement mechanism Sa adapted on the flexional outer circumferential side of the example of the present invention comprises a horn-shaped engagement protrusion 114a and a recess-shaped hole 115a, which detachably engages with the engagement protrusion 114a of the adjacent side plate.

The concave portion/convex portion engagement mechanism Sb adapted on the flexional inner circumferential side comprises an engagement protrusion 114b composed of a hook and a recess 115b, which detachably engages the engagement protrusion 114b.

The concave portion/convex portion engagement mechanism Sc adapted in the vicinity of a coupling portion 113 of the side plate 110 comprises an engagement protrusion 114c composed of a cylindrical engagement pin and a dimple-shaped hole 115c, which detachably engages the engagement protrusion 114c.

Further, between a stepped, offset side surface of a front side plate portion 111 positioned on a flexional outer circumferential side and a front end of the front side plate portion of the subsequent side plate (not shown) and between a stepped, offset side surface of a rear side plate portion 112 positioned on a flexional inner circumferential side and a front end of the rear side plate portion of the subsequent side plate (not shown) are formed two sets of linear position holding surfaces each holding a linear connection state of the side plate 110. A flexional outer circumferential side linear position holding surface Xa and a flexional inner circumferential side linear position holding surface Xb, respectively, located on a flexional outer circumferential side and on a flexional inner circumferential side.

Further, between a stepped, offset side surface of a rear side plate portion 112 positioned on a flexional inner circumferential side and a front end of the rear side plate portion of the subsequent side plate (not shown) and between a stepped, offset side surface of a front side plate portion 111 positioned on a flexional outer circumferential side and a stepped, offset side surface of a rear side plate portion of the subsequent side plate (not shown) are formed two sets of flexional position restricting surfaces each surface restricting a flexional connection state of the side plate 110. The two sets of the flexional position restricting surfaces are a flexional inner circumferential side flexional position restricting surface Yb and a flexional outer circumferential side flexional position restricting surface Ya, respectively.

As explained above, in the cable or the like protection and guide device 100 of the present invention, in the state of linear position holding as shown in FIGS. 1 to 3, the flexional outer circumferential side linear position holding surfaces Xa and the flexional inner circumferential linear position holding surfaces Xb abut on each other, while the flexional inner circumferential side flexional position restricting surfaces Yb and the flexional outer circumferential side flexional position restricting surfaces Ya are respectively opened so that the linear position is reliably held without applying a load to the coupling portion 113. In the state of flexional position restriction as shown in FIG. 1, the flexional inner circumferential side flexional position restricting surfaces Yb and the flexional outer circumferential flexional position restricting surfaces Ya abut on each other, while the flexional outer circumferential side linear position holding surfaces Xa and the flexional inner circumferential side linear position holding surfaces Xb are respectively opened, so that the flexional position is reliably held without applying a load to the coupling portion 113.

The louver type connecting plate 120 used in the cable or the like protection and guide device according to the present example is shown in FIGS. 6 to 7. The louver connecting plate 120 includes a pair of right and left supporting shafts 121, 121 which extend from both ends. The supporting shafts are attachably fitted onto a pair of right and left side plates (not shown). A louver body serves as a lid by pivoting about the pair of right and left supporting shafts 121, 121. The louver type connecting plate engages a connecting plate engagement mechanism L (La, Lb, Lc, Ld), which is described later, between the pair of right and left side plates (not shown).

The connecting plate engagement mechanism L comprises: a width direction positioning portion La where the supporting shaft 121 of the louver type connecting plate 120 and a fitting shaft hole 116 in the side plate 110 are engaged with each other in a partially cut out concave portion/convex portion combination arrangement; a pivot restricting portion Lb where the supporting shaft 121 of the louver type connecting plate 120 and a fitting shaft hole 116 in the side plate 110 are engaged with each other in a partially cut out concave portion/convex portion combination arrangement; a horizontal direction positioning portion Lc engaged in a concave portion/convex portion combination arrangement between the louver body 122 of the louver type connecting plate 120 and a tongue piece supporting portion 117 formed in a protruded manner on the inner side of the side plate 110; and a bridge state holding portion Ld where the louver body 122 of the louver type connecting plate 120 is engaged with the tongue piece supporting portion 117 of the side plate 110 in a concave portion/convex portion combination arrangement.

The incorporation steps of the above-described side plate 110 with the louver type connecting plate 120 will be described with reference to FIGS. 8 to 11.

First, as shown in FIG. 8 while a louver body 122 of a louver connecting plate 120 stands upright, a pair of right and left supporting shafts 121, 121 found on both ends of the louver connecting plate 120 in a protruded manner are placed in a state where these supporting shafts 121, 121 respectively face fitting shaft holes 116, 116 formed in a pair of right and left side plates 110, in a state just before their incorporation.

Figure 9:
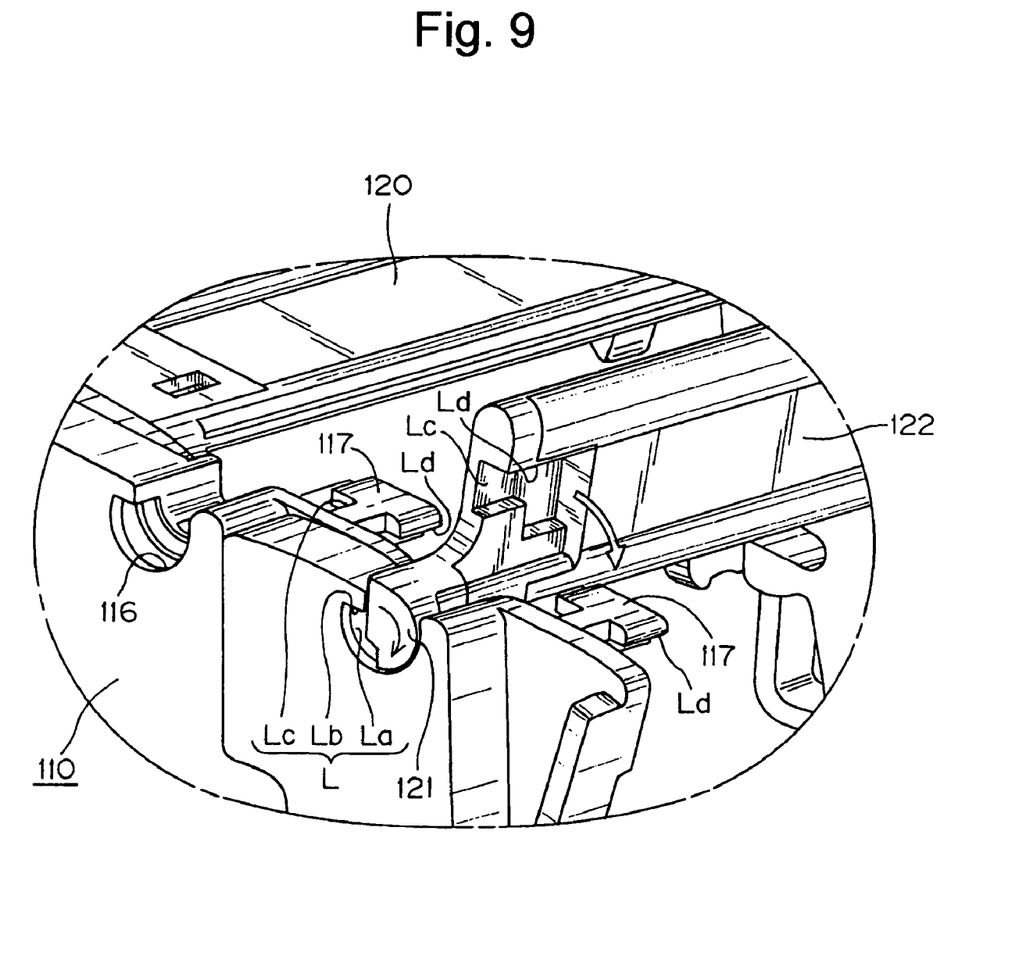
FIG. 9 is an enlarged view showing a state just before incorporation of a louver type connecting plate.

And as shown in FIG. 9, from a state where the louver body 122 of the louver type connecting plate 120 stands, the pair of right and left supporting shafts 121 are respectively incorporated into the fitting shaft holes 116 formed in the pair of right and left side plates 110. At this time a width direction positioning portion La formed by partially cutting out the supporting shaft 121 and the fitting shaft hole 116 guides the supporting shaft 121 of the louver type connecting plate 120 to a proper setting position without generating a displacement in the width direction in the fitting shaft hole 116.

Then as shown in FIG. 10, the supporting shaft 121 of the louver type connecting plate 120 incorporated into the fitting shaft hole 116 of the side plate 110 with about ¾ rotation or pivot in the fitting shaft hole 116 to reach a lid-like state of the louver body 122 of the louver type connecting plate 120. At this time, a pivot restricting portion Lb formed by cutting out a part of each of the supporting shaft 121 and the fitting shaft hole 116 by about a ¼ rotation portion guides the louver body 122 of the louver type connecting plate 120 to a pivot restriction position. This pivot restriction position exhibits a complete lid-like state of the louver body 122.

In this manner, a lid-like state of the louver body 122 of the louver type connecting plate 120 or a louver type connecting plate's so-called incorporation completion state is shown in FIG. 11. At this time, the horizontal direction positioning portion Lc formed between the louver body 122 of the louver type connecting plate 120 and the tongue piece supporting portion 117 formed on an inner side of the side plate in a protruded manner allows the louver body 122 of the louver type connecting plate 120 to engage with the tongue piece supporting portion 117 of the side plate 110 in a concave portion/convex portion combination thereby to reliably hold the horizontal direction of the louver type connecting plate 120.

Figure 12:
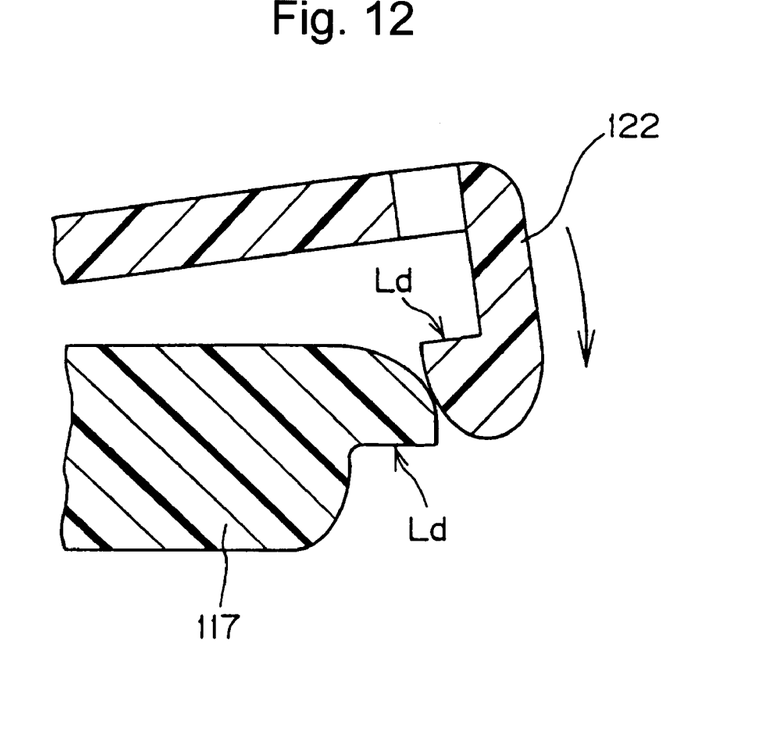
FIG. 12 is a partial cross-sectional view showing a start state of concave portion/convex portion engagement.
Figure 13:
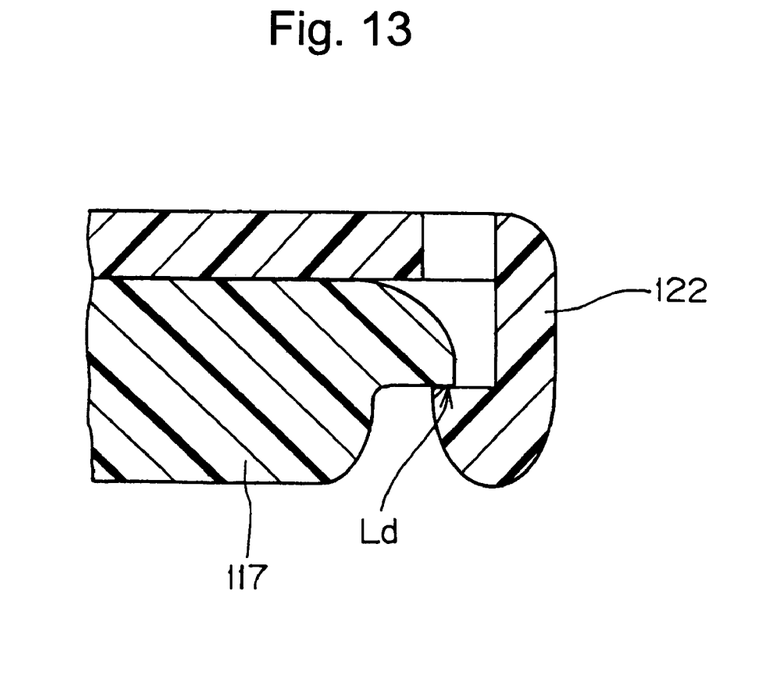
FIG. 13 is a partial cross-sectional view showing a completion state of concave portion/convex portion engagement.

It is noted that FIGS. 12 and 13 are partial cross-sectional views showing a concave portion/convex portion engagement operation between the louver body 122 of the louver type connecting plate 120 and the tongue piece supporting portion 117 of the side plate 110. In particular, FIG. 12 is a partial cross-sectional view showing a start state of concave portion/convex portion engagement. FIG. 13 is a partial cross-sectional view showing a completion state of concave portion/convex portion engagement.

In the bridge state of the louver type connecting plate 120, both ends of the louver body 122 abut on the inner sides of the side plates 110. As a result when a cable or the like C is protected and guided while being flexed, even if the cable or the like C receives such shearing force that it is crushed in the width direction, both ends of the louver body 122 entirely abut on the inner sides of the side plates 110, so that the cable accommodating space surrounded by the side plates 110 and the louver type connecting plates 120 can be strongly ensured.

It is noted that the disassembling of the cable or the like protection and guide device 100 of the present example may be, of course, performed by the opposite steps of the assembling steps of the side plates 110 with the louver type connecting plates 120 as shown in FIGS. 8 to 11.

In the thus obtained cable or the like protection and guide device 100 of the present example, even if force, which comes out of the cable or the like C, is generated during the protection and guide of the cable or the like C, a strong connection of the louver type connecting plates prevents inadvertent disengagement of the cable or the like protection and guide device. Since the pair of right and left supporting shafts 121, 121 formed at both ends of the louver type connecting plate 120 is fitted onto the pair of right and left side plates 110, 110 as shown in FIG. 2, the louver type connecting plate 120 is supported on the pair of right and left side plates 110, 110 at both ends of the louver type connecting plate 120. The supporting shafts 121, 121 are engaged with the side plates so that an inadvertent disengagement can be completely avoided. Further, since both ends of the louver type connecting plate 120 are simultaneously fitted into the pair of right and left side plates 110, 110 during operation of opening and closing the connecting plates 120, bite damage due to offset of the cable or the like C accommodated inside can be completely avoided during the operation of opening and closing the connecting plates 120.

Further, as shown in FIG. 3, since the louver body 122 of the louver type connecting plate 120 is formed so as to be pivoted or rotated about a pair of right and left supporting shafts 121, 121, the louver type connecting plate 120 is pivoted with respect to the side plate 110, so that the louver body 122 can be raised without being removed from the side plate during maintenance for the cable or the like C. Thus, the cable or the like C is exposed, so that it is easily maintained.

Further, when the louver type connecting plate 120 is incorporated to the side plates 110, the above-described width direction positioning portion La correctly positions and guides the louver type connecting plate 120 without displacing them in the width direction with respect to the side plate.

Then, when the incorporated louver type connecting plate 120 is moved as a lid-like element with respect to the side plates 110, the pivot restricting portion Lb rotates the supporting shaft 121 of the louver type connecting plate 120 in a side plate fitting shaft hole 116 of the side plate 110 and positions and guides the louver body 122 of the louver type connecting plate 120 to the lid position. When the incorporated and rotated louver type connecting plate 120 is held at the lid position, the bridge state holding portion Ld allows the louver body 122 of the louver type connecting plate 120 to engage with the tongue piece supporting portion 117 formed on the inner side of the side plate in a concave portion/convex portion combination thereby holding the bridge state of the louver type connecting plate 120. Assembly and disassembly operations such as attachment and detachment of the louver type connecting plate 120 and the like can be extremely easily and efficiently attained.

Both ends of the louver body 122 abut on the inner sides of the side plates in a bridged state of the louver type connecting plate 120. As a result, when the cable or the like protection and guide device protects and guides a cable or the like C in a flexed state, even if a shearing force that crushes the cable or the like C in the width direction is received, both ends of the louver body 122 entirely abut on the inner sides of the side plates thereby to strongly ensure the integrity of the cable accommodating space surrounded by side plates 110 and louver type connecting plates 120. Thus, excellent dimensional stability and endurance of the cable or the like protection and guide device is attained even in flexion and stretch operations for a long period of time.

DESCRIPTION OF REFERENCE NUMERALS

100 . . . Cable or the like protection and guide device
110 . . . Side plate
111 . . . Front side plate portion
112 . . . Rear side plate portion
113 . . . Coupling portion 114a ... Flexional outer circumferential side engagement protrusion
114b ... Flexional inner circumferential side engagement protrusion
114c ... Engagement protrusion
115a ... Flexional outer circumferential side hole to be engaged
115b ... Flexional inner circumferential side hole to be engaged
115c ... Hole to be engaged
116 ... Fitting engagement hole
117 ... Tongue piece supporting portion
120 ... Louver type connecting plate
121 ... Supporting shaft
122 ... Louver body
Sa, Sb, Sc ... Concave portion/convex portion engagement mechanism
Xa ... Flexional outer circumferential side linear position holding surface
Ya ... Flexional outer circumferential side flexional position restricting surface
Xb ... Flexional inner circumferential side linear position holding surface
Yb ... Flexional inner circumferential side flexional position restricting surface
C ... Cable (Cables) or the like α ... Maximum opening angle between flexional position restricting surfaces
La ... Width direction positioning portion
Lb ... Pivot restricting portion
Lc ... Horizontal direction positioning portion
Ld ... Bridge state holding portion

We claim:

1. A cable protection and guide device, comprising:
a plurality of pairs of right and left spaced side plates and a plurality of connecting plates;
said side plates are articulately connected to each other in a longitudinal direction enabling said side plates to form a flexional circumferential bend having a flexional inner circumferential side and flexional outer circumferential side;
each of said side plates includes a flexional inner circumferential side residing during bending on said flexional inner circumferential side of said bend;
each of said side plates includes an outer circumferential side residing during bending on said outer flexional circumferential side of said bend;
each of said side plates is integrally formed of a front side plate portion, a rear side plate portion, and, a flexible coupling portion intervened between said front side plate portion and said rear side plate portion;
each side of said pair of right and left spaced side plates is connected in a longitudinal direction by a snap-fit mechanism, said snap-fit mechanism interengages said rear side plate portion of a preceding side plate and said front side plate portion of a subsequent side plate;
pairs of said right and left spaced side plates are connected in a width direction by one of said connecting plates;
said plurality of connecting plates detachably bridge said cable protection and guide device over said flexional inner circumferential sides and said flexional outer circumferential sides of said side plates in predetermined intervals;
each of said connecting plates includes a body, a right end portion having a right supporting shaft extending therefrom, and a left end portion having a left supporting shaft extending therefrom;
each of said supporting shafts of said connecting plates are attachably fitted into respective connecting plate engagement mechanisms of said right and left side plates which pivotably secure said connecting plates to said right and left spaced side plates;
a cable accommodating space is formed by said side plates which extend in said longitudinal direction and said connecting plates which are detachably bridged in said width direction over said flexional inner circumferential sides and said flexional outer circumferential sides; and,
a cable extends in said longitudinal direction within said cable accommodating space.

2. A cable protection and guide device according to claim 1, wherein:
each of said side plates includes: a fitting shaft hole, said fitting shaft hole is partially cut-out forming a pivot restricting portion therein; an inner side; and a tongue piece supporting portion, said tongue piece supporting portion of said side plate is formed on said inner side of said side plate;
each of said connecting plate engagement mechanisms of said side plates includes a body, a right end portion and a left end portion;
said supporting shafts of said connecting plate includes a generally cylindrically shaped portion thereof, said generally cylindrically shaped portion includes, in cross section, a cut-out portion with an abutting stop;
said cut-out portion of said generally cylindrically shaped supporting shafts enabling interengagement with and insertion into said partially cut-out fitting shaft holes in said side plates and rotation of said shafts within said fitting holes until said abutting stop of said partially cut-out portion of said shaft interengages said pivot restricting portion of said fitting holes;
said connecting plate includes a bridge state holding portion, said bridge state holding portion comprises a recess in said connecting plate; and,
said tongue piece supporting portion on said inner side of said side plate interengages said recess in said connecting plate securing said connecting plate to said side plates.

3. A cable protection and guide device according to claim 2, wherein said connecting plate has a right end portion and a left end portion, said end portions of said body abut on said inner sides of said side plates in a bridged state of said connecting plate.

4. A cable protection and guide device, comprising:
a plurality of connecting plates,
a plurality of pairs of right and left side plates; each of said right and left side plates includes an arc shaped recess therein terminating in a pivot restricting portion;
said side plates are articulately connected to each other in a longitudinal direction enabling said side plates to form a flexional circumferential bend having a flexional inner circumferential side and flexional outer circumferential side;
each of said side plates includes a flexional inner circumferential side residing during bending on said flexional inner circumferential side of said bend;
each of said side plates includes an outer circumferential side residing during bending on said outer flexional circumferential side of said bend;
each of said side plates is integrally formed of a front side plate portion, a rear side plate portion, and, a flexible coupling portion intervened between said front side plate portion and said rear side plate portion;

each of said connecting plates includes a body and first and second end portions;

each of said connecting plates a supporting shaft; said supporting shaft is generally cylindrically shaped with a cut-away portion forming, in cross section, an arc-shape;

each of said connecting plates are detachably bridged over said flexional inner circumferential sides and said flexional outer circumferential sides of said side plates;

said connecting plates extend in a width direction across said cable protection and guide device;

said arc-shaped recess in said side plates and said arc-shaped supporting shafts interengage said connecting plates with each other;

each of said arc-shaped supporting shafts of said connecting plates includes an abutting stop thereon;

said pivot restricting portion of said arc-shaped recess of each of said side plates interengages with said abutting stop of said arc-shaped supporting shaft limiting rotation of said connecting plate with respect to said side plate;

a bridge state holding portion in which said connecting plate includes a holding portion and said side plate includes a tongue piece supporting portion; and, said holding portion of said connecting plate engagement mechanism interengages said tongue piece of said side plate preventing said connecting plate from disengaging said side plates.

* * * * *